No. 802,213. PATENTED OCT. 17, 1905.
A. W. HIGHT.
PIPE BAND FASTENING.
APPLICATION FILED DEC. 23, 1904.
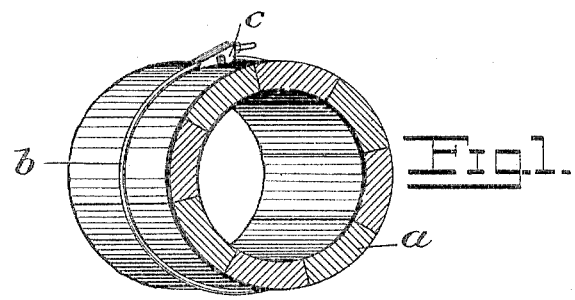
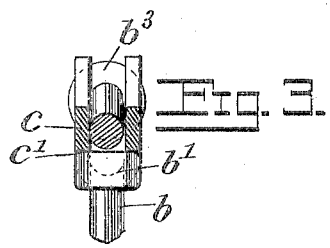
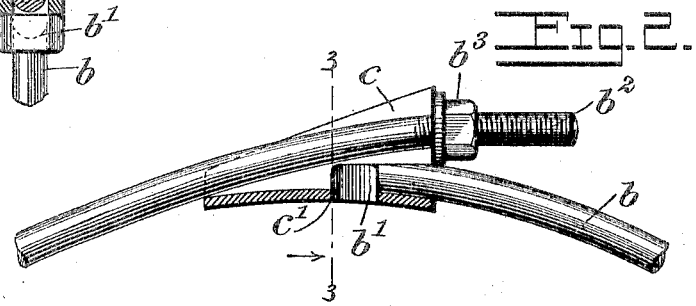
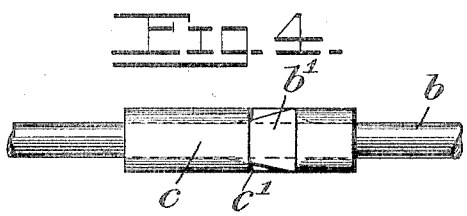
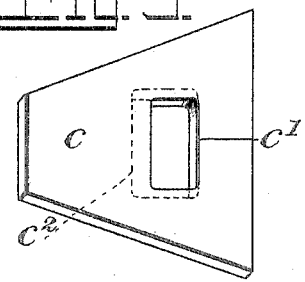
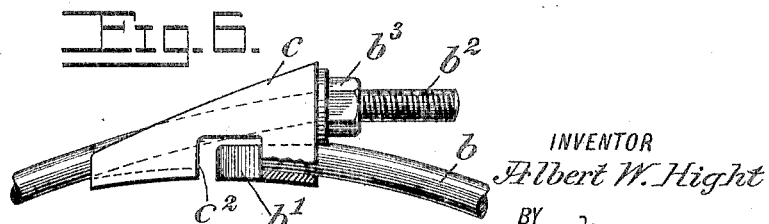
WITNESSES:
L. Almquist
Isaac B. Owens
INVENTOR
Albert W. Hight
BY
Munn
ATTORNEYS

UNITED STATES PATENT OFFICE.

ALBERT WATSON HIGHT, OF BALLARD, WASHINGTON, ASSIGNOR TO BALLARD DROP FORGE CO., OF BALLARD, WASHINGTON, A CORPORATION OF WASHINGTON.

PIPE-BAND FASTENING.

No. 802,213.　　　Specification of Letters Patent.　　　Patented Oct. 17, 1905.

Application filed December 23, 1904. Serial No. 238,110.

*To all whom it may concern:*

Be it known that I, ALBERT WATSON HIGHT, a citizen of the United States, and a resident of Ballard, in the county of King and State of Washington, have invented a new and Improved Pipe-Band Fastening, of which the following is a full, clear, and exact description.

The invention relates to a coupling or fastening for joining together the ends of the iron or other bands used to hold together stave-piping, casks, tanks, and similar structures.

The object of the invention is to provide an absolutely-secure connection with which the ends of the band may be engaged and tightened to any desired tension. In attaining this end I employ what I term a "shoe" formed of an integral metal plate with an opening therein. This plate is bent around a head on one end of the band, forming the shoe in essentially U-shaped cross-sectional form, and the other end of the band being fitted in the shoe and having a nut thereon engaged with one end of the shoe, so that by tightening up the nut any desired tension may be exerted on the band.

Reference is had to the accompanying drawings, which illustrate several forms of the invention, in which drawings like characters of reference indicate like parts in the several views, and in which—

Figure 1 is a sectional perspective view showing a length of stave-piping having my invention applied. Fig. 2 is an enlarged longitudinal section showing the ends of the band and the shoe for joining them together. Fig. 3 is a cross-section on the line 3 3 of Fig. 2. Fig. 4 is an inner side view of the fastening. Fig. 5 is a view showing the blank from which the shoe is formed, this view indicating by broken lines the form of the opening in the shoe, which is adapted removably to connect the shoe with the band; and Fig. 6 is a view showing this modified form of the invention.

As shown in Fig. 1, the pipe is made up of a number of staves $a$, engaged with each other and held by a band $b$, the ends of which are adjustably connected so that any desired tension may be exerted on the band. My invention resides in the means for joining together the ends of the bands. As shown in Fig. 2, the band has at one end a head $b'$, preferably of trapezoidal form. The other end $b^2$ of the band is threaded and provided with a nut $b^3$. The shoe $c$ is formed from a blank, as shown in Fig. 5, this blank being composed of a sheet of metal, such as soft steel, with an opening $c'$ therein. The blank is preferably trapezoidal in form, though this is not essential, and in forming the shoe $c$ the end of the band having the head $b'$ is placed over the shoe with the head lying directly opposite the opening $c'$. The blank is now by the aid of a suitable die or press stamped up into the U-shaped cross-sectional form illustrated in Fig. 3, the said end of the band $b$ lying in the bottom of the shoe and the walls of the opening $c'$ extending around and inclosing the head $b'$, thus securely and permanently locking together the shoe and the band. The other end of the band is passed through the shoe over the first end and the nut $b^3$ engaged with the edge of the shoe, as shown in Fig. 4. It is clear that this forms a firm connection between the parts, and at the same time it permits the adjustment of the nuts $b^3$ to any desired extent. The opening $c'$, it will be observed, passes clear through the thickness of the metal of which the shoe is formed, and the head $b'$ on the end of the band projects beyond each side of the band and inward beyond its inner circumference, so that the head when set in the opening in the shoe engages in the bottom or connecting part of the shoe and also in the parts of the opening in the side walls of the shoe. This effects a most secure connection between the parts.

By making the opening $c'$ of the shoe $c$ sufficiently large—for example, as indicated by the broken lines $c^2$ in Fig. 5—the connection between the headed end of the band and the shoe may be made removable at will, this arrangement being illustrated in Fig. 6, where it will be observed that the walls of the opening $c^2$ are spaced from the sides of the head and are therefore out of tight contact with said walls. This allows the shoe to be tilted on the band sufficiently to pass the head $b'$ completely through the opening $c^2$, and then the band may be removed at will by drawing it through the opening in the shoe. The parts may be replaced in the position shown in Fig. 6 by a reversal of the above-described operation.

Various changes in the form, proportions, and minor details of my invention may be resorted to at will without departing from the spirit and scope thereof. Hence I consider myself entitled to all such variations as may lie within the terms of my claim.

Having thus described the preferred form of my invention, what I claim as new, and desire to secure by Letters Patent, is—

The combination of a band having a head at one end, said head projecting beyond the sides and beyond the inner circumference of the band, and an integral essentially U-shaped shoe having an opening therein intermediate its ends, the opening being formed in the bottom or connecting part of the shoe and in the adjacent parts of the side walls of the shoe, and said head of the band being engaged in the opening whereby to effect connection between the head and shoe at the bottom and side walls of the latter, and means for connecting the other end of the band with the shoe.

In testimony whereof I have signed my name to this specification in the presence of two subscribing witnesses.

ALBERT WATSON HIGHT.

Witnesses:
WM. THAANUM,
L. B. WALTERS.